United States Patent
Greiner et al.

(10) Patent No.: US 6,734,243 B2
(45) Date of Patent: May 11, 2004

(54) COMPONENT AND METHOD FOR THE PRODUCTION THEREOF

(75) Inventors: Robert Greiner, Baiersdorf (DE); Angelo Polese, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/149,909

(22) PCT Filed: Dec. 13, 2000

(86) PCT No.: PCT/DE00/04428
§ 371 (c)(1),
(2), (4) Date: Nov. 1, 2002

(87) PCT Pub. No.: WO01/44359
PCT Pub. Date: Jun. 21, 2001

(65) Prior Publication Data
US 2003/0149160 A1 Aug. 7, 2003

(30) Foreign Application Priority Data
Dec. 15, 1999 (DE) .......................... 199 60 551

(51) Int. Cl.⁷ .................................. C08K 3/40
(52) U.S. Cl. ...................... 524/403; 524/414; 523/223; 501/45; 428/325
(58) Field of Search ................ 524/403, 414; 523/223; 501/42–48; 428/325

(56) References Cited

U.S. PATENT DOCUMENTS 5,328,874 A * 7/1994 Beall et al. .................. 501/45

FOREIGN PATENT DOCUMENTS

| EP | 0 365 236 | 4/1990 | |
| EP | 0 390 148 | 10/1990 | |
| EP | 0 773 196 | 5/1997 | |
| JP | 04202364 A * | 7/1992 | ........... C08L/81/02 |
| JP | 10101364 A * | 4/1998 | ............. C03C/3/19 |

OTHER PUBLICATIONS

USPTO translation of JP 4–202364 (Jul. 23, 1992), Ogita et al.*

Machine translation from Japenese Patent Office of JP 10–101364 (Apr. 21, 1998), Usui et al.*

Derwent abstract AN 1998–291893; of JP10101364 (Apr. 21, 1998).

Derwent abstract AN 1992–295528; of JP4202364; of JP4202364(Jul. 23, 1992).

* cited by examiner

Primary Examiner—Matthew A. Thexton
(74) Attorney, Agent, or Firm—Young & Thompson

(57) ABSTRACT

A component (1) which includes a material formed from a glass/polymer mixture. The component has first regions, in which the glass is present substantially in the form of spherical particles (2) and second regions, in which the glass is present in the form of fibre-type particles (3). A component of this type advantageously provides both mechanical stability and dimensional consistency in separate areas within the same component.

11 Claims, 1 Drawing Sheet

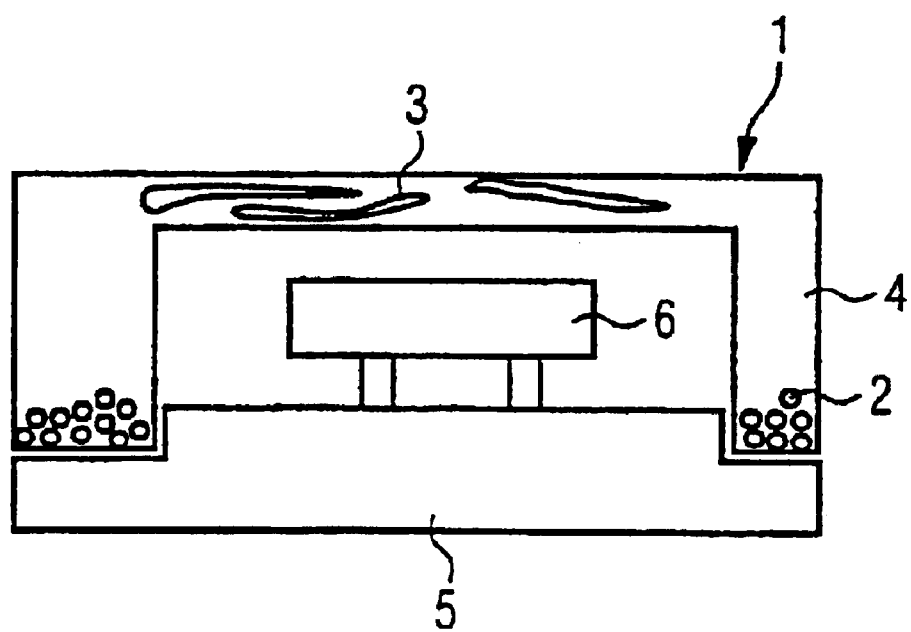

COMPONENT AND METHOD FOR THE PRODUCTION THEREOF

BACKGROUND OF THE INVENTION

The invention relates to a component which at least partially comprises a material which represents a mixture of glass and plastic. The invention also relates to a process for producing the component.

Components used in electrical engineering and electronics are increasingly being produced from plastic materials, particularly those based on thermoplastics. A filler is added to the plastic material in order to improve the mechanical and thermal properties. In particular, glass is used as the filler. To improve the mechanical stability of the plastic material, the glass is added in the form of glass fibers (glass fiber-reinforced plastics). Furthermore, there are mineral-filled plastic materials in which the glass is present in the form of particles which are typically approximately spherical. With mineral-filled plastics of this type, it is possible to achieve an isotropic shrinkage and distortion behavior for the components produced therefrom.

Mineral-filled plastics of this type are known, for example, from EP 0 365 236 A1 as an alloy in the form of a melt mixture comprising at least one inorganic glass and/or a glass-ceramic and at least one organic thermoplastic or thermoset; the proportion of the glass or glass-ceramic is 30 to 90% by volume. The glass component is a phosphate glass which, for example, has the following composition (mol %): 44 to 58% of $P_2O_5$, 4 to 10% of $Al_2O_3+B_2O_3$ (with 0 to 7% of $Al_2O_3$ and 0 to 10% of $B_2O_3$), 10 to 45% of $Li_2O+Na_2O$ (with 0 to 30% of $Li_2O$ and 10 to 30% of $Na_2O$), 0 to 20% of $Cu_2O$ and 10 to 30% of $Li_2O+CuO_2$. The thermoplastic polymer may be selected from the following group: polyaryl ether ketones, polyphenylene sulfides, polyfluoronated resins, polyetherimides, liquid crystal polyesters, polyether sulfones, polytetrafluorethylenes, polyether ether ketones, polyether ketones, polyethyl terephthalates, polybutyl terephthalates, melamines and polycarbonates. The thermoset may be an epoxy resin, a silicone resin, a polyimide, a phenol formaldehyde resin or a diallyl phthalate.

Glass fiber-reinforced plastics have the drawback that, on account of the preferential direction which is pre-determined by the fibers, the performance of the material has a pronounced anisotropy which above all has adverse effects on the shrinkage and distortion of the component. Plastics provided with a filler in particle form have the drawback above all of being insufficiently rigid and resistant to thermal deformation. Since in known components the vitreous filler is present in the plastic fiber either exclusively in fiber form or exclusively in particle form, it is not possible to optionally avoid one of the abovementioned drawbacks depending on the functional section of the component. For example, a cover cap which is fitted onto a mounting plug for a relay in which the cover region is mechanically stable and at the same time the region which is coupled to the mounting plug and joined thereto in a positively locking manner is resistant to thermal deformation would be desirable. In addition, as the filler content rises, the plastic becomes increasingly difficult to process, since the flow properties of the known glass/plastic mixtures are greatly reduced as the proportion of glass increases. In particular, the production of thin-walled components or of components with a complicated geometry becomes more difficult as a result.

SUMMARY OF THE INVENTION

Therefore, it is an object of the present invention to provide a component which has both regions which are mechanically stable and regions which are dimensionally and thermally stable.

The invention describes a component which at least partially comprises a glass/plastic mixture. This mixture has first regions in which the glass is present substantially in the form of spherical particles. Approximately spherical particles in granule form can also be used as the spherical particles. Furthermore, the mixture has second regions, in which the glass is present in the form of particles in fiber form.

This component according to the invention has the advantage that in the first regions it is subject to extremely little distortion even at elevated temperatures, on account of the isotropy of the spherical particles. Moreover, in the second regions the component has a high mechanical stability, on account of the reinforcement provided by the glass fibers.

Suitable components are in particular also very thin-walled components, for example cover caps. Therefore, it is particularly advantageous to provide a component in which the size of the spherical particles is less than 10 μm. Accordingly, in principle it is possible to achieve corresponding wall thicknesses of as little as 10 μm.

Furthermore, a component in which, in the glass/plastic mixture, a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$ is present as the glass and a high-performance thermoplastic is present as the plastic, is particularly advantageous.

A "low-melting" sulfophosphate glass is understood as meaning a glass with a low glass temperature T2, in particular a glass with T2<300° C. The glass temperature is to be understood as meaning the temperature at which the glass softens and thus becomes able to flow. A "high-performance thermoplastic" is a high-performance polymer and specifically in the present case, a temperature-stable plastic (heat-resistant polymer, high-temperature resistant polymer). The processing temperature T1 of the plastic is at least 300° C., since only in this way is it possible to ensure that the components produced therefrom are able to withstand soldering baths. The glass temperature T2 is lower than the processing temperature T1, with the result that the glass is in the free-flowing state. As a result, the glass/plastic mixture has very good flow properties for the production of thin-walled components or of components with a complicated geometry.

The glass/plastic mixtures according to the invention have good mechanical and thermal properties and good processing properties, in particular a good ability to flow, even with a high filler content, i.e. a high glass content. Moreover, they are distinguished by an excellent resistance to chemicals, in particular to water, acids and bases, and specifically, surprisingly, without the need for stabilizers to be added. Furthermore, the glass/plastic mixtures have an excellent resistance to abrasion, and the material can be recycled without problems, since there is no shortening of the glass component as occurs in glass fiber-reinforced mixtures.

The glass/plastic mixtures according to the invention preferably include a glass with a glass temperature of 250° C.$\leq$T2$\leq$280° C. In the mixtures, it is preferable to use a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$. This glass has a glass temperature T2 of 268° C.

The high-performance thermoplastic used is advantageously a polyether ether ketone (PEEK), a polyetherimide (PEI), a polyphenylene sulfide (PPS), a partially aromatic polyamide, such as polyphthalamide (PPA) or a liquid crystal polymer (LCP). In these polymers, the glass temperature of the glass component is matched to the processing temperature of the thermoplastic material. Further high-performance thermoplastics which can be used are polyaryl ether ketones (PAEK) in general, for example polyether ketones (PEK), and polysulfones (PSU), in particular polyether sulfones (PES) and polyphenylene sulfones (PPSU).

The proportion of the glass component, i.e. of the sulfophosphate glass, in the glass/plastic mixture is preferably 15 to 60% by weight. For certain applications, however, the glass content may be up to 80% by weight. The mixtures may also contain standard additives, such as color pigments and stabilizers. Possible applications are, for example, in sensors, actuators, plug connectors, electro-optical components and relays.

Furthermore, the invention describes a process for producing a component from a glass/plastic mixture. The starting point is formed by a mixture of a thermoplastic with a processing temperature T1 and spherical glass particles with a glass temperature T2<T1. From this mixture, the component is molded at a temperature T3>T1. Since T2<T3, the glass particles are in the free-flowing state. Therefore, at locations where shear forces are exerted on them, they are stretched into fibers.

The inventive production of the component with the aid of glass particles whose glass temperature is lower than the processing temperature of the glass/plastic mixture makes it possible to provide the originally spherical glass particles with a new shape by exerting shear forces. Since, as has already been explained above, the shape of the glass particles is substantially responsible for determining whether the component is predominantly mechanically stable or dimensionally stable, it thereby becomes possible to deliberately set the properties of the component by exerting shear forces during production of the component.

A process for producing a component from a glass/plastic mixture in which glass particles with a size of <10 $\mu$m are used is particularly advantageous. Glass particles of this type make it possible to consider in particular even very thin-walled components, for example as a cover cap. Therefore, in principle it is possible to achieve corresponding wall thicknesses of as little as 10 $\mu$m.

The component is particularly advantageously molded by injection-molding using an injection mold. In this case, the viscosity of the thermoplastic and, at least in certain locations, the distance between opposite surfaces of the injection mold are selected in such a way that the shear forces which occur at the interface between the injection mold and the flowing thermoplastic act on the glass particles over the entire cross section of the component.

The production of a component from a glass/plastic mixture by means of an injection-molding process according to the invention of this type has the advantage that the locations at which the glass is to be present in the form of fibers can be defined by the selection of the component shape or the injection mold. In this context, it should be ensured that, given a fixedly preset distance between opposite surfaces of the injection mold and therefore a predetermined wall thickness of the component, the viscosity and therefore the internal friction of the thermoplastic has a decisive influence on the extent to which the shear forces which occur at the injection mold/flowing thermoplastic interface are transferred into the interior of the component. In order, therefore, to stretch the glass particles into fibers in a certain region over the entire cross section or the entire wall thickness of the component, a high viscosity of the thermoplastic allows a greater maximum wall thickness than a low viscosity.

Furthermore, a process in which the glass/plastic mixture used is a mixture comprising particles of a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic, is particularly advantageous. This composition has the advantages which have already been described above.

It is preferable to use a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

Suitable high-performance thermoplastics are in particular a polyether ether ketone, a polyetherimide, a polyphenylene sulfide, a partially aromatic polyamide or a liquid crystal polymer.

The proportion of glass in the glass/plastic mixture is preferably between 15 and 60% by weight.

DESCRIPTION OF THE DRAWINGS

In the text which follows, the invention is explained in more detail with reference to an exemplary embodiment and the associated figure.

The FIGURE shows a component according to the invention in diagrammatic cross section.

DESCRIPTION OF PREFERRED EMBODIMENTS

The FIGURE shows a component 1 according to the invention which is a cap which covers an electrical component 6 which has been soldered into a mounting plug 5. The cap or the component 1 consists of a mixture of plastic 4 and spherical glass particles 2 and glass particles 3 which are in fiber form. In the regions of the cap 1 in which the glass particles are in fiber form, the cap preferably has the high mechanical stability with respect to a compressive load which is applied from above. In the regions of the cap 1 in which the glass particles are spherical, the cap preferably has a high dimensional stability. This ensures that the positive lock between the cap 1 and the mounting plug 5 is present at all times, even at elevated temperatures. The glass particles 3 in fiber form in the upper part of the cap 1 are produced by means of an injection-molding process using thin wall thicknesses in combination with a plastic of high viscosity, with shear forces at the injection mold/flowing thermoplastic interface acting on the glass particles over the entire cross section of the components. The shear forces are transmitted inward into the component by internal friction of the thermoplastics.

The invention is not restricted to the embodiment which is shown by way of example, but rather as defined by the claims.

What is claimed is:

1. A component which at least partially comprises a material that is a mixture of a glass and a plastic, the component having first regions in which the glass is present substantially in the form of spherical particles, and having second regions in which the glass is present in the form of particles in fiber form; the size of the spherical particles being less than 10 $\mu$m.

2. The component as claimed in claim 1, wherein the glass/plastic mixture includes as the glass, a sulfophosphate glass having a glass temperature T2<3200° C. of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$; and as the plastic, a thermoplastic selected from the group consisting of a polyether ether ketone (PEEK), a polyetherimide (PEI), a polyphenylene sulfide (PPS), a partially aromatic polymide, a liquid crystal polymer (LCP), a polyaryl ether ketone (PAEK), a polyether ketone, and a polysulfone (PSU).

3. The component as claimed in claim 2, wherein the glass/plastic mixture includes, as the glass, a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

4. The component as claimed in claim 3, wherein the thermoplastic is polyether ether ketone, a polyetherimide, a polyphenylene sulfide, a partially aromatic polyamide or a liquid crystal polymer.

5. The component as claimed in claim 2, wherein the glass content in the glass/plastic mixture is 15 to 60% by weight.

6. A process for producing a component from a glass/plastic mixture, which comprises:

preparing a mixture comprising a thermoplastic with a processing temperature T1 and spherical glass particles with a glass temperature T2<T1;

molding from said mixture the component at a temperature T3>T1; and forming at least in part glass fibers from the spherical glass particles, at certain locations where shear forces are exerted on the glass particles which, since T2<T3, are in a free-flowing state.

7. The process as claimed in claim 6, wherein glass particles, which have a size of <10 μm, are used.

8. The process as claimed in claim 6, wherein the glass/plastic mixture used is a mixture comprising particles of a low-melting sulfophosphate glass of the following composition: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a thermoplastic selected from the group consisting of a polyether ether ketone (PEEK), a polyetherimide (PEI), a polyphenylene sulfide (PPS), a partially aromatic polymide, a liquid crystal polymer (LCP), a polyaryl ether ketone (PAEK), a polyether ketone, and a polysulfone (PSU).

9. The process as claimed in claim 8, wherein a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$ is used.

10. The process as claimed in claim 8, wherein the thermoplastic used is a polyether ether ketone, a polyetherimide, a polyphenylene sulfide, a partially aromatic polyamide and a liquid crystal polymer.

11. The process as claimed in claim 10, wherein a glass/plastic mixture with a glass content of between 15 and 60% by weight is used.

* * * * *